United States Patent
Piller

[15] 3,655,388
[45] Apr. 11, 1972

[54] SILVER HALIDE MATERIAL CONTAINING A MONOAZO DYESTUFF

[72] Inventor: Bernhard Piller, Marly-le-Petit, Switzerland

[73] Assignee: Ciba Limited, Basel, Switzerland

[22] Filed: Feb. 11, 1970

[21] Appl. No.: 10,602

[30] Foreign Application Priority Data

Feb. 13, 1969 Switzerland ................................2163/69

[52] U.S. Cl. ................................................96/99, 96/73, 96/20
[51] Int. Cl. ..............................................................G03c 1/10
[58] Field of Search .......................................................96/99, 73

[56] References Cited

UNITED STATES PATENTS 3,211,554  10/1965  Dreyfuss .................................. 96/99
3,454,402   7/1969  Anderau et al. ........................ 96/99

*Primary Examiner*—J. Travis Brown
*Attorney*—Harry Goldsmith, Joseph G. Kolodny and Mario A. Monaco

[57] ABSTRACT

Photographic light-sensitive material especially for the silver dyestuff bleaching process containing a monoazo dyestuff of the formula

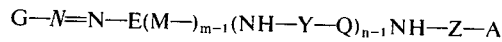

$$G-N=N-E(M-)_{m-1}(NH-Y-Q)_{n-1}NH-Z-A$$

in which G is a naphthalene radical which in 1-position contains an azo group, in 2-position a phenylamino group and in 8-position a hydroxyl group and at least one sulfonic acid or sulfonic acid amide group, E is an aromatic radical which contains at most 2 sulfonic acid or sulfonic acid amide groups, M is a phthalic acid imide or an —NH—X—D— radical, X and Y are —CO— or —CO—NH— radicals, D and Q are aromatic radicals, Z is an —SO$_2$—, —CO— or —CO—NH— radical, A is an aliphatic aromatic or heterocyclic radical and $m$ and $n$ are 1 or 2. These dyestuff are magenta dyestuffs and are fast to diffusion, easily soluble in water insensitive to calcium ions and completely bleachable to white.

11 Claims, No Drawings

SILVER HALIDE MATERIAL CONTAINING A MONOAZO DYESTUFF

The subject of the invention are monoazo dyestuffs of formula (1) $\quad G-N=N-E-(M-)_{m-1}$
$\qquad (NH-Y-Q-)_{n-1}NH-Z-A$ wherein G denotes a naphthalene residue which in the 1-position contains an azo group, in the 2-position contains an optionally substituted phenylamino group, and in the 8-position contains a hydroxyl group, as well as at least one sulphonic acid or sulphonic acid amide group, E denotes a mono or bicyclic aromatic residue which contains at most 2 sulphonic acid groups or sulphonic acid amide groups, the residues G and E together contain 1 to 4 sulphonic acid or sulphonic acid amide groups, M denotes a phthalic acid imide residue bonded to E via the imide nitrogen atom or denotes a residue of formula (2) $\quad -NH-X-D-$, which is bonded to E by the nitrogen atom, X and Y each denote a residue of formula (3a) $\quad -CO-$
or
(3b) $\quad -CO-NH-$, with the nitrogen atom being bonded to D or Q, D and Q denote a mono or bicyclic aromatic residue, Z denotes a residue of formula $-CO-$ or $-CONH-$, wherein the nitrogen atom is bonded to A, or a $-SO_2-$ residue, A denotes an aliphatic, aromatic or heterocyclic residue, and 13 and n each denote 1 or 2. E can for example be an optionally further substituted naphthalene, diphenyl or above all benzene residue.

At the same time monoazo dyestuffs of formula

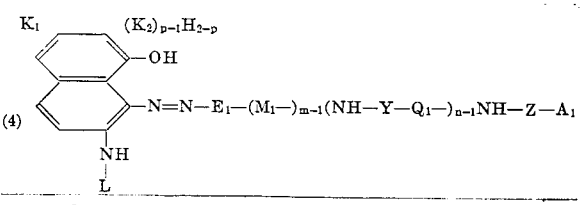

are preferred, wherein $K_1$ and $K_2$ each denote a sulphonic acid or sulphonic acid amide group, L denotes an optionally substituted benzene residue, $E_1$ denotes an optionally substituted benzene or naphthalene residue, $M_1$ denotes a residue of formula $\qquad -NH-X-D_1-$ (5)

which is bonded to $E_1$ by the nitrogen atom, $D_1$ and $Q_1$ each denote an optionally substituted benzene residue, $A_1$ denotes an optionally substituted lower aliphatic residue, an optionally substituted benzene residue or a heterocyclic residue containing N, O or S, $m$, $n$ and $p$ each denote 1 or 2, and X, Y and Z have the indicated significance.

Preferably, $K_1$ and $K_2$ represent sulphonic acid groups, and $E_1$ represents an optionally substituted benzene residue. To the extent that $A_1$ represents an optionally substituted lower aliphatic residue, it is for example an alkyl residue with at most 4 carbon atoms, such as a methyl residue, or an aralkyl residue such as an optionally further substituted benzyl residue. Amongst the heterocyclic residues for $A_1$, 6-membered N-heterocyclic residues and above all 5-membered N—, O— or especially S-heterocyclic residues are preferred.

Special interest attaches to monoazo dyestuffs of formula

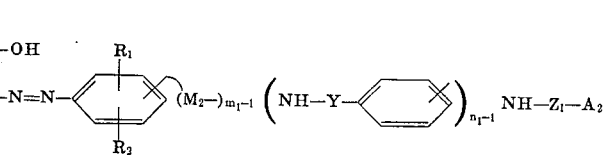

wherein $L_1$ represents a benzene residue which is substituted at least once by a lower alkyl or alkoxy group, a halogen atom or a sulphonic acid, alkylsulphonyl or alkylcarbonyl group, $R_1$ and $R_2$ each represent a hydrogen atom, a sulphonic acid group or a lower alkyl group, and $M_2$ denotes a residue of formula (7) 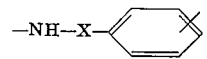

which is bonded by the nitrogen atom to the residue

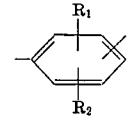

$Z_1$ denotes a residue of formula (3a) $-CO-$ or (3b) $-CO-NH-$, wherein the nitrogen atom is bonded to $A_2$, $A_2$ denotes a hydrogen atom, a lower alkyl group, a thienyl group or a residue of formula (8) 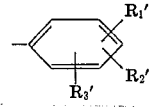

wherein $R_1'$ represents a hydrogen or halogen atom, an optionally substituted lower alkyl or alkoxy group, an optionally substituted benzyl group, an optionally substituted benzoyl group, a phenylsulphonyl, nitro or carboxyl group or an optionally substituted carboxylic acid amide group, and $R_2'$ and $R_3'$ represent a hydrogen or halogen atom or a nitro, a lower alkyl or alkoxy group, and $m_1$ and $n_1$ are 1 or 2 and the sum of $m_1 + n_1$ is at most 3, and X and Y have the indicated significance. The lower alkyl or alkoxy residues for $R_1$, $R_2$, $R_1'$, $R_2'$ and $R_3'$ or for substituents in $L_1$ and $A_2$ as a rule contain at most four carbon atoms, preferably one carbon atom.

Very suitable monoazo dyestuffs correspond to the formula

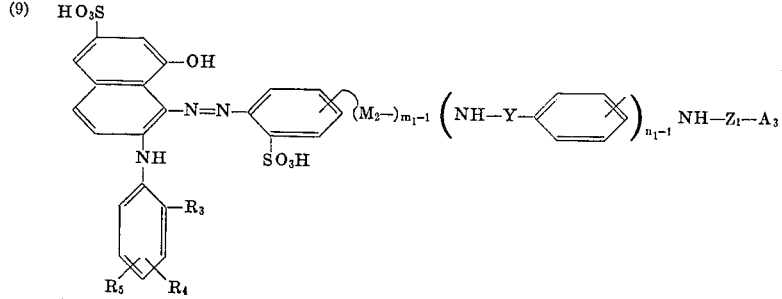

wherein $R_3$ denotes a hydrogen or chlorine atom or a methyl or methoxy group, $R_4$ denotes a fluorine or chlorine atom or a methyl, methoxy, trifluoromethyl, methylcarbonyl, methylsulphonyl or sulphonic acid group and $R_5$ denotes a hydrogen atom or a methyl group, $A_3$ denotes a hydrogen atom, an alkyl group with at most four carbon atoms or a residue of formula

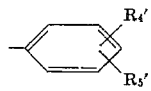

wherein $R_4'$ denotes a hydrogen or chlorine atom, a methyl, methoxy, trifluoromethyl, nitro, phenylsulphonyl, or carboxyl group, an optionally further substituted benzyl, benzoyl or carboxylic acid amide group, $R_5'$ denotes a hydrogen or chlorine atom, or a methoxy or nitro group, and $M_2$, $Y$, $Z_1$, $m_1$ and $n_1$ have the indicated significance.

Monoazo dyestuffs of formula (10)

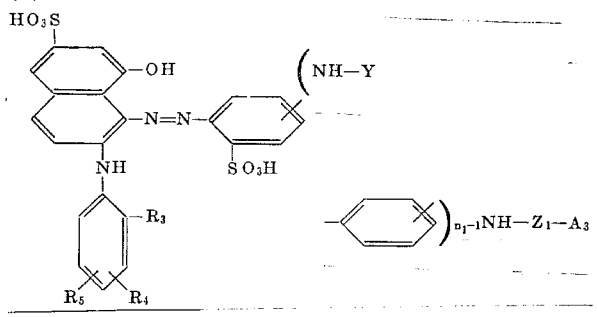

wherein $R_3$, $R_4$, $R_5$, $Y$, $Z_1$, $A_2$ and $n_1$ have the indicated significance, have proved particularly advantageous.

However, monoazo dyestuffs of formula (11)

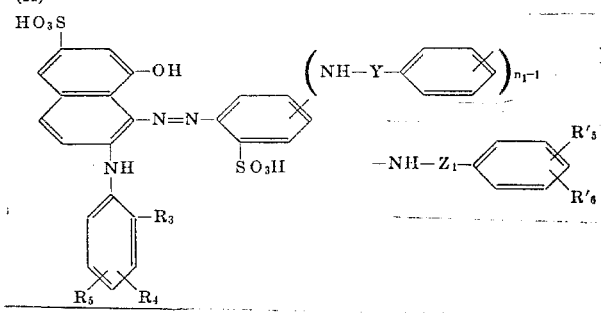

are of particular interest, wherein $R_6'$ denotes a hydrogen atom, a chlorine atom, or a trifluoromethyl, methyl, methoxy, phenylsulphonyl, carboxyl, p-carboxybenzyl or p-carboxybenzoyl group, and $R_3$, $R_4$, $R_5$, $R_5'$, $Y$, $Z_1$ and $n_1$ have the indicated significance.

Amongst these dyestuffs, those of formula (12)

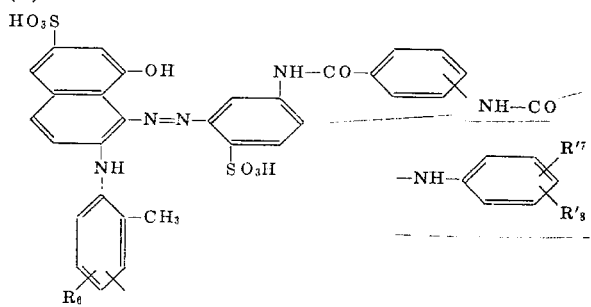

are in turn particularly preferred, wherein $R_6$ denotes a methyl group or a chlorine atom, $R_7'$ denotes a chlorine atom or a methyl or methoxy group, and $R_8$ denotes a methoxy group, or a chlorine or hydrogen atom. Such suitable dyestuffs correspond to the formulae (25), (26), (27), (30), (44), (51) and (55) quoted in the examples.

The dyestuffs of formulae (1), (4), (6), (9), (10), (11) and (12) can be manufactured according to various processes which are in themselves known. One process is for example characterized in that a compound of formula

(13) $G - N = N - E - (M-)_{m^-1} (NH - H - Q-)_{n^-1}$ $NH_2$ is reacted with a compound of formula

(14)     $A - T$ wherein T denotes a residue of formula

—OCN,  — CO — Hal or — $SO_2$ — Hal, with Hal representing a halogen atom, preferably a chlorine atom, or with the anhydride of an aliphatic or aromatic monocarboxylic or dicarbodylic acid, and G, E, M, Y, Q, A, m and n having the indicated significance.

An appropriate procedure for this is that, for example, an amine of formula

(15)      $H_2N - E - (M-)_{m-1} NO_2$ wherein E, M and m have the indicated significance is first diazotised and is coupled in an acid medium to a naphthylamine of formula

(16)     $G - H$ wherein G has the indicated significance. Thereafter the nitro group is reduced in the usual manner. The aminomonoazo dyestuff thus obtained is optionally reacted with a compound of formula

(17)    $T_1 — Q — NO_2$  or  (18)  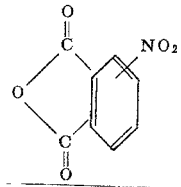

wherein Q has the indicated significance and $T_1$ denotes an isocyanate or carboxylic acid halide, preferably chloride, residue, and after reduction of the nitro group is reacted as indicated with a compound of formula (14) or with the anhydride of an aliphatic or aromatic monocarboxylic or dicarboxylic acid.

Instead of the compounds of formula (15) it is also possible to react compounds of formula

(19)      $H_2N — E —(M—)_{m-1} — W$ wherein E, M and m have the indicated significance and W represents a residue of formula — N = $W_1$, or — NH — $W_2$, with $W_1$ and $W_2$ each representing a removable protective group, with a compound of formula (16) and, after removal of the protective group, with a compound of formula (17) or (18).

The condensation of amines with acid halides, isocyanates and anhydrides takes place according to methods which are in themselves known and is advantageously carried out in a polar solvent such as water or in a polar organic solvent such as pyridine, methanol, glycol, diethylacetamide, dimethylformamide or N-methylpyrrolidone.

It can also be of advantage if the condensation is carried out in the presence of acid-binding agents, such as for example alkali carbonates. Solvents such as pyridine or especially N-methylpyrrolidone in themselves already act as acid-binding agents.

The residue G in formula (1) are derived from compounds of formula (16), which for example correspond to the following formulae:

(16.1) 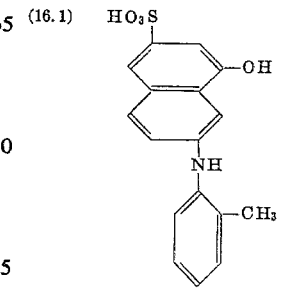   (16.2) 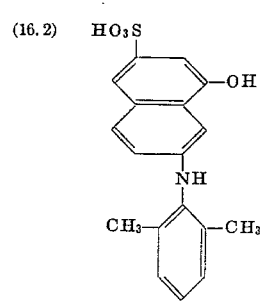

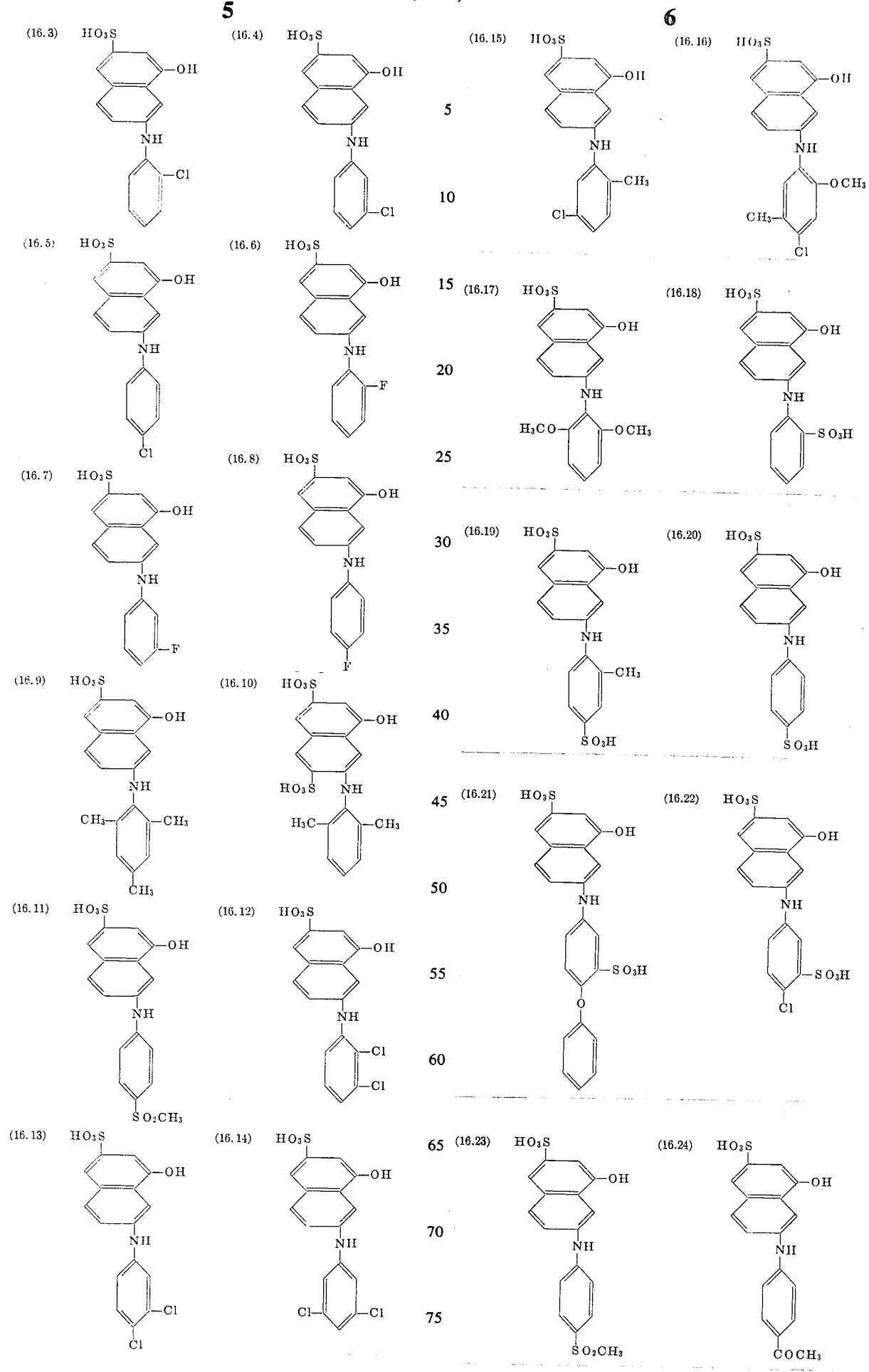

(16.25) 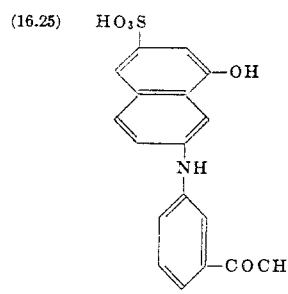
(16.26) 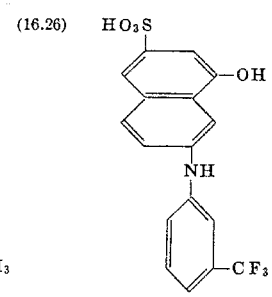

(16.27) 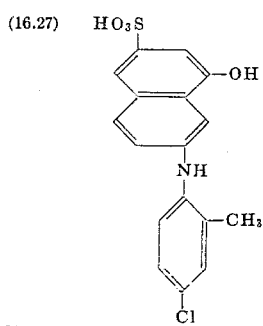
(16.28) 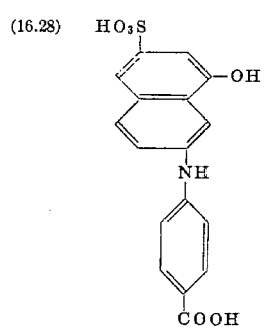

As examples of the compounds of formulae (15) and (19), from which the residues —N  N—E—(M—)$_m$-$_1$NH— are derived, there may be mentioned: 1-amino-4-nitrobenzene, 1-amino-2-methyl-4-nitrobenzene, 1-amino-2-methoxy-4-nitrobenzene, 1-amino-2-chloro-4-nitrobenzene, 1-amino-4-methylmercapto-3-nitroaniline, 1-amino-4-nitrobenzene-2-sulphonic acid, 1-amino-4-nitrobenzene-3-sulphonic acid, 1-amino-5-nitrobenzene-2-sulphonic acid, 1-amino-5-methyl-4-nitrobenzene-2-sulphonic acid, 1-amino-2,5-dimethoxy-4-nitrobenzene, 1-amino-4-methyl-5-nitrobenzene-2-sulphonic acid, 1-amino-2-cyano-4-nitrobenzene and 1-amino-2-trifluoromethyl-4-nitrobenzene.

(15.1) 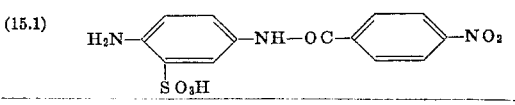

(15.2) 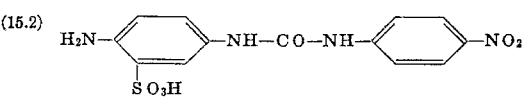

(15.3) 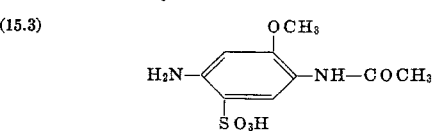

(15.4) 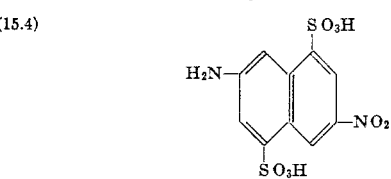

(15.5) 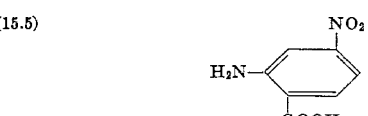

(15.6) 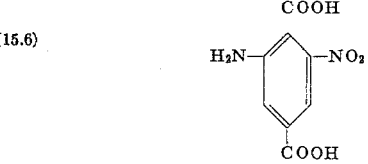

(19.1) 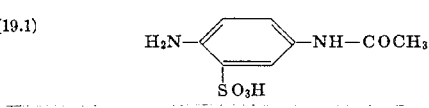

(19.2) 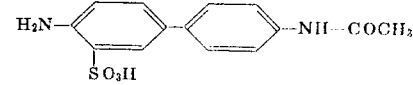

(19.3) 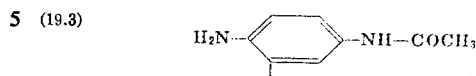

(19.4) 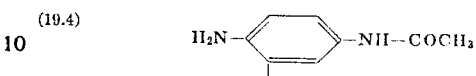

(19.5) 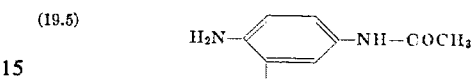

(19.6) 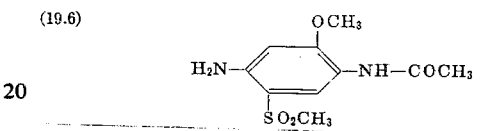

The residues of formulae
— D — X — NH — and — Q — Y — NH —
in formula (1) are for example derived from the following acids or their halides, the following isocyanates or the following anhydrides: 3-nitrobenzoic acid, 4-nitrobenzoic acid, 3-methyl-4-nitrobenzoic acid, 3-methoxy-4-nitrobenzoic acid, 2-chloro-4-nitrobenzoic acid, 2-chloro-5-nitrobenzoic acid, 4-chloro-3-nitrobenzoic acid, 3-acetylamino-5-nitrobenzoic acid, 3-nitrophenylisocyanate, 4-nitrophenylisocyanate, 4-nitro-1-naphthoic acid, 3-nitro-phthalic anhydride and 4-nitro-phthalic anhydride.

As examples of compounds of formula (14) from which the residues -z-a are derived there may be mentioned: acetic acid, trichloracetic acid, benzoic acid, 3-methylbenzoic acid, 4-methylbenzoic acid, 4-methoxybenzoic acid, 4-phenoxybenzoic acid, 4-benzoylbenzoic acid, 4-benzenesulphonylbenzoic acid, 3-chlorobenzoic acid, 4-fluorobenzoic acid, 3-acetylaminobenzoic acid, 4-acetylaminobenzoic acid, 4-nitrobenzoic acid, 2-chloro-4-nitrobenzoic acid, 2,4-dichlorobenzoic acid, 3-trifluoromethylbenzoic acid, 3-sulphobenzoic acid, 3-sulphamidobenzoic acid, terephthalic acid, thiophene-2-carboxylic acid, pyridine-4-carboxylic acid, furane-2-carboxylic acid, phenylisocyanate, 3-chlorophenylisocyanate, 4-chlorophenylisocyanate, 4-methoxyphenylisocyanate, 4-trifluoromethylphenylisocyanate, 4-nitrophenylisocyanate, 3-nitrophenylisocyanate, 3,4-dichlorophenylisocyanate, 2,5-dichlorophenylisocyanate, 4-acetylaminophenylisocyanate, 2,5-dimethoxyphenylisocyanate, 2-phenoxy-5-chlorophenylisocyanate and 4-methylbenzenesulphonic acid.

The residues Z – A can furthermore be derived from the following anhydrides: acetic anhydride, maleic anhydride, benzoic anhydride, phthalic anhydride and 4-nitrophthalic anhydride.

The dyestuffs of formula (1) can be used for various purposes, for example in photographic materials and herein particularly advantageously as image dyestuffs for the silver dyestuff bleaching process. Accordingly, valuable photographic materials can be manufactured in a usual manner which is in itself known, which contain at least one layer with a dyestuff of formula (1) on a layer support.

In particular, these dyestuffs can be present in a multi-layer material which contains, on a layer support, a layer dyed with green-blue dyestuff which is selectively sensitive to red, on top of this a layer dyed purple with a dyestuff of formula (1) which is selectively sensitive to green, and finally a layer dyed with a yellow dyestuff which is sensitive to blue. It is however also possible to incorporate the dyestuffs of formula (1) into an auxiliary layer or especially into a layer adjacent to the light-sensitive layer.

The dyestuffs of formula (1) simultaneously possess excellent diffusion-resistance, but are at the same time also easily soluble in water, insensitive to calcium ions and completely bleachable to white.

Compared to dyestuffs with an unsubstituted or alkyl-substituted amino group in the 2-position of the residue G, they are especially distinguished by better resistance to oxidizing baths, such as are for example used in photographic reversal processes, and also by better diffusion resistance.

The dyestuffs according to the invention also offer numerous possibilities for varying the spectral properties and are distinguished by extraordinarily pure and brilliant color shades and by surprisingly high color strength.

The extremely favorable shape of the spectral absorption curve permits these purple dyestuffs to be combined in many ways with one suitable yellow dyestuff and one suitable blue green dyestuff. Grey shades which appear neutral to the eye are thereby achieved over the entire density range.

EXAMPLE 1

21.6 g. of the aminomonoazo dyestuff of formula (20)

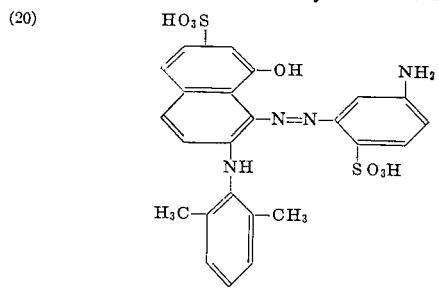

are dissolved in 400 ml. of water with the addition of the requisite amount of sodium carbonate, a solution of 14.8 g. of p-nitrobenzoyl chloride in 20 ml. of acetone is added at pH 7 and room temperature whilst stirring, this addition is repeated after 2 hours, and the product which has separated out is filtered off.

The dyestuff of formula (21)

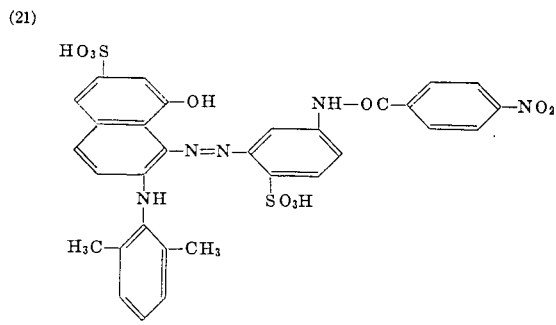

is obtained in almost quantitative yield in the form of a wine-red powder which is a single substance according to a thin layer chromatogram.

21 g of nitro compound of formula (21), by reduction with sodium sulphide, yields 12 g of pure amino compound of formula (22)

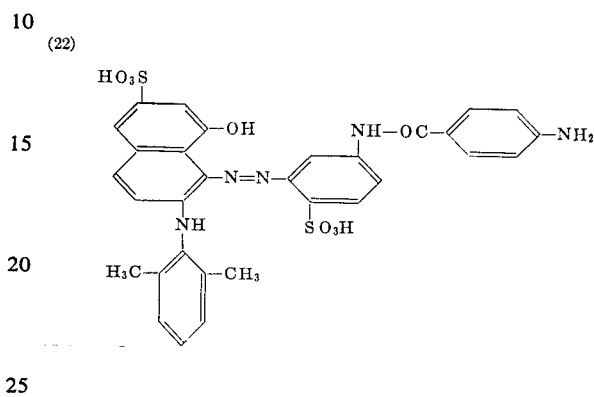

in the form of a red powder.

1.3 g. of dyestuff of formula (22) are dissolved in 30 ml. of N-methyl-2-pyrrolidone and are reacted, by addition of 1.0 g. of benzoyl chloride, to give the purple dyestuff of formula (23) according to Table I which is obtained in an electrophoretically unobjectionable quality and good yield, in the form of a brown-red powder by precipitation with 37 percent strength hydrochloric acid.

EXAMPLE 2

6.6 g. of amino compound of formula (22) are dissolved in 220 ml. of water to give a neutral solution and are stirred at room temperature with repeated addition of a solution of 1.8 ml. of phenylisocyanate in 25 ml. of acetone until no further starting product can be detected in the thin layer chromatogram.

A colourless by-product which has precipitated is filtered off and the dyestuff is precipitated with 7 N potassium acetate solution. The dark red powder which is obtained in almost quantitative yield corresponds to formula (24) according to Table I.

The dyestuffs of formula (25) to (69) are obtained analogously.

| Formula No. | $G-N=N-E-(M-)_{m-1}(NH-Y-Q-)_{n-1}NH-$ | m | n | —Z— | —A | Absorption maximum in nm In DMF-H₂O (1:1) | In gelatine |
|---|---|---|---|---|---|---|---|
| (23) | HO₃S, OH, NH—, N=N, NH, HO₃S, H₃C—CH₃ (phenyl) | 2 | 1 | —CO— | phenyl | 522/538 | 563 |
| (24) | Same as above | 2 | 1 | —CONH— | phenyl | 522/537 | 548 |
| (25) | do | 2 | 1 | CONH— | phenyl-OCH₃ | 524 | 550 |

| Formula No. | G—N=N—E—(M—)$_{m-1}$(NH—Y—Q—)$_{n-1}$NH— | m | n | —Z— | —A | Absorption maximum in nm In DMF-H$_2$O (1:1) | In gelatine |
|---|---|---|---|---|---|---|---|
| (26) | do | 2 | 1 | —CONH— | –C$_6$H$_4$–Cl (ortho) | 530 | 556 |
| (27) | do | 2 | 1 | —CONH— | –C$_6$H$_4$–Cl (para) | 522 | 530 |
| (28) | do | 2 | 1 | —CONH— | –C$_6$H$_3$Cl$_2$ | 530 | 536 |
| (29) | do | 2 | 1 | —CONH— | –C$_6$H$_4$–CF$_3$ | 530 | 540 |
| (30) | do | 2 | 1 | —CONH— | –C$_6$H$_4$–CH$_3$ | 522 | 530 |
| (31) | do | 2 | 1 | —CO— | –C$_6$H$_4$–SO$_2$–C$_6$H$_5$ | 520 | 530 |
| (32) | [naphthalene with HO$_3$S, OH, NH(2,6-dimethylphenyl), N=N–C$_6$H$_3$(SO$_3$H)(NH–)] | 1 | 1 | —CONH— | –C$_6$H$_5$ | 530 | 570 |
| (33) | Same as above | 1 | 1 | —CO— | –CH$_2$–C$_6$H$_4$–NO$_2$ | 524/538 | 524/546 |
| (34) | do | 1 | 1 | —CO— | –C$_6$H$_4$–SO$_2$–C$_6$H$_5$ | 522/536 | 550 |
| (35) | do | 1 | 1 | —CONH— | –C$_6$H$_4$–OCH$_3$ | 522/540 | 536 |
| (36) | [naphthalene with HO$_3$S, OH, NH(2,6-dimethylphenyl), N=N–C$_6$H$_3$(SO$_3$H)(NH–)] | 1 | 1 | —CONH— | –C$_6$H$_3$(OCH$_3$)(Cl) with Cl | 530 | 550/585 |
| (37) | Same as above | 1 | 1 | —CONH— | –C$_6$H$_4$–NO$_2$ | 522/538 | 576 |
| (38) | [naphthalene with HO$_3$S, OH, NH(2,6-dimethylphenyl), N=N–C$_6$H$_2$(SO$_3$H)(CH$_3$)(NH–)] | 1 | 1 | —CO— | –C$_6$H$_3$(NO$_2$)(COOH) | 522/541 | 524/545 |

| Formula No. | G—N=N—E—(M—)$_{m-1}$(NH—Y—Q—)$_{n-1}$NH— | m | n | —Z— | —A | Absorption maximum in nm In DMF-H₂O (1:1) | In gelatine |
|---|---|---|---|---|---|---|---|
| (39) | HO₃S-naphthalene(OH)(NH-2,6-dimethylphenyl)—N=N—phenyl(NH-)(CH₃)(SO₃H) | 1 | 1 | —CO— | —C₆H₄—CH₂— ; —C₆H₄—COOH | 552/540 | 526/542 |
| (40) | Same as above | 1 | 1 | —CO— | —C₆H₄—CO— ; —C₆H₄—COOH | 522/540 | 523/544 |
| (41) | HO₃S-naphthalene(OH)(NH-2,6-dimethylphenyl)—N=N— with biphenyl-SO₃H—NH— | 1 | 1 | —CONH— | —C₆H₄—CH₃ | 539/560 | 547/567 |
| (42) | Same as above | 1 | 1 | —CONH— | 2,5-dichlorophenyl | 538/559 | 579/624 |
| (43) | HO₃S-naphthalene(OH)(NH-2,6-dimethylphenyl)—N=N— with —NH—OC—C₆H₄—NH— (HO₃S substituent) | 2 | 1 | —CO— | —C₆H₄—NO₂ | 520/538 | 566 |
| (44) | Same as above | 2 | 1 | —CONH— | 2,5-dimethoxyphenyl (OCH₃, H₃CO) | 522/540 | 544 |
| (45) | do | 2 | 1 | —CONH— | 2,5-dichlorophenyl | 522/540 | 534 |
| (46) | do | 2 | 1 | —CO— | thienyl | 520/536 | 526/544 |

| Formula No. | G—N=N—E—(M—)$_{m-1}$(NH—Y—Q—)$_{n-1}$NH— | m | n | —Z— | —A | Absorption maximum in nm | |
|---|---|---|---|---|---|---|---|
| | | | | | | In DMF-H$_2$O (1:1) | In gelatine |
| (47) | [structure: naphthalene with HO$_2$S, OH, N=N, NH-(2,6-dimethylphenyl); NH-CO-HN-phenyl-NH with HO$_3$S on dimethylphenyl] | 2 | 1 | —CO— | —CH$_3$ | 520/540 | 550/580 |
| (48) | [structure: naphthalene with HO$_3$S, OH, N=N, NH-phenyl-SO$_3$H; NH-OC-phenyl-NH with HO$_3$S on dimethylphenyl] | 2 | 1 | —CONH— | [p-tolyl with CH$_3$] | 536 | 546 |
| (49) | Same as above | 2 | 1 | —CONH— | [2,5-dimethoxyphenyl with OCH$_3$, H$_3$CO] | 536 | 546 |
| (50) | [structure: naphthalene with HO$_3$S, OH, N=N, NH-(chloro-methylphenyl); NH-OC-phenyl-NH with HO$_3$S on methylphenyl] | 2 | 1 | —CO— | [phenyl] | 522/540 | 540/570 |
| (51) | Same as above | 2 | 1 | —CONH— | [phenyl-Cl] | 522/540 | 526/540 |

| Formula No. | G—N=N—E—(M—)$_{m-1}$(NH—Y—Q—)$_{n-1}$NH— | m | n | —Z— | —A | Absorption maximum in nm In DMF-H$_2$O (1:1) | In gelatine |
|---|---|---|---|---|---|---|---|
| (52) | [naphthalene with HO$_3$S, OH, N=N, NH-tolyl-SO$_3$H, NH-CO-phenyl-SO$_3$H, NH—] | 2 | 1 | —CONH— | [phenyl-Cl] | 524 | 540 |
| (53) | [naphthalene with HO$_3$S, OH, N=N, NH-(Cl-phenyl)-NH-CO-NH-phenyl-SO$_3$H, NH—] | 2 | 1 | —CO— | —CH$_3$ | 520 | 532 |
| (54) | [naphthalene with HO$_3$S, OH, N=N, NH-(2,6-dimethylphenyl)-NH-CO-phenyl-SO$_3$H, NH—] | 2 | 1 | —CO— | [phenyl] | 522/540 | 524/548 |
| (55) | Same as above | 2 | 1 | —CONH— | [phenyl-CH$_3$] | 522/540 | 540 |
| (56) | ...do... | 2 | 1 | —CONH— | [phenyl-Cl] | 520/540 | 530/544 |

| Formula No. | G—N=N—E—(M—)$_{m-1}$(NH—Y—Q—)$_{n-1}$NH— | m | n | —Z— | —A | Absorption maximum in nm In DMF-H$_2$O (1:1) | In gelatine |
|---|---|---|---|---|---|---|---|
| (57) | [naphthalene with HO$_3$S, OH, N=N, NH-phenyl-SO$_3$H, NH-OC-phenyl-NH-, HO$_3$S, CH$_3$ substituents] | | 2 | 1 | —CONH— | [phenyl-CH$_3$] | 534 | 544 |
| (58) | [naphthalene with HO$_3$S, OH, N=N-phenyl(HO$_3$S)-NH, NH-xylyl(H$_3$C, CH$_3$), —OC-phenyl-NH—] | 2 | 1 | —CO— | [phenyl] | 530/554 | 538/568 |
| (59) | Same as above | 2 | 1 | —CONH— | [phenyl] | 530/553 | 558/591 |
| (60) | [naphthalene with HO$_3$S, OH, N=N-phenyl(HO$_3$S), NH-xylyl, —NH—CO—NH-phenyl-NH—] | 2 | 1 | —CO— | —CH$_3$ | 528/555 | 540/568 |
| (61) | [naphthalene with HO$_3$S, OH, NH, N=N-phenyl(HO$_3$S)-NH, NH-xylyl, —CO-phenyl-NH-OC-phenyl-NH] | 2 | 2 | —CONH— | [phenyl-CH$_3$] | 524/550 | 530 |

| Formula No. | G—N=N—E—(M—)$_{m-1}$(NH—Y—Q—)$_{n-1}$NH— | m | n | —Z— | —A | Absorption maximum in nm In DMF-H$_2$O (1:1) | In gelatine |
|---|---|---|---|---|---|---|---|
| (62) | HO$_3$S-[naphthalene with OH, N=N, NH-(2,4,6-trimethylphenyl), linked to phenyl with NH— and HO$_3$S] | 1 | 1 | —CONH— | 3,4-dichlorophenyl | 520/540 | 542/572 |
| (63) | HO$_3$S-[naphthalene with OH, N=N, NH-(3-CF$_3$-phenyl), linked to phenyl with NH—] | 1 | 1 | —CONH— | 3,4-dichlorophenyl | 530 | 547/585 |
| (64) | HO$_3$S-[naphthalene with OH, N=N, NH-(3-F-phenyl), linked to phenyl with NH— and HO$_3$S] | 1 | 1 | —CONH— | 3,4-dichlorophenyl | 532 | 547/585 |
| (65) | HO$_3$S-[naphthalene with OH, N=N, NH-(3,4-dichlorophenyl), linked to phenyl with NH— and HO$_3$S] | 1 | 1 | —CONH— | 3,4-dichlorophenyl | 530 | 535 |
| (66) | HO$_3$S-[naphthalene with OH, N=N, NH-(3,4-dichlorophenyl), linked to phenyl with NH— and HO$_3$S] | 1 | 1 | —CONH— | 3,4-dichlorophenyl | 530 | 552/588 |

| Formula No. | G—N=N—E—(M—)$_{m-1}$(NH—Y—Q—)$_{n-1}$NH— | m | n | —Z— | —A | Absorption maximum in nm In DMF-H₂O (1:1) | In gelatine |
|---|---|---|---|---|---|---|---|
| (67) | HO₃S-[naphthalene with OH, NH, N=N-phenyl-NH—; HO₃S; H₃CO-phenyl-OCH₃] | 1 | 1 | —CO— | —CH₃ | 524/536 | 531/548 |
| (68) | HO₃S-[naphthalene with OH, NH, N=N-phenyl-NH—; HO₃S; phenyl-COCH₃] | 1 | 1 | —CONH— | -phenyl-Cl,Cl (dichlorophenyl) | 535 | 548/587 |
| (69) | HO₃S-[naphthalene with OH, NH, N=N-phenyl-NH—; HO₃S; phenyl-SO₂CH₃] | 1 | 1 | —CO— | —CH₃ | 523 | 534 |

EXAMPLE 3

3.3 ml. of 6 percent strength gelatine solution, 2.0 ml. of 1 percent strength aqueous solution of the curing agent of formula (70)

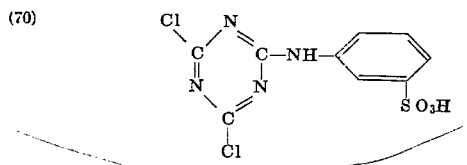

0.5 ml. of a 1 percent strength aqueous solution of the purple dyestuff of formula (23) and 3.3 ml. of silver bromide emulsion containing 35 g. of silver per liter are pipetted into a test tube and made up to 10.0 ml. with deionized water. This solution is vigorously mixed and kept for 5 minutes at 40° C. in a waterbath.

The casting solution, which is at 40° C., is cast onto a substrated glass plate of size 13 cm. × 18 cm. After solidifying at 10° C., the plate is dried in a drying cabinet with circulating air at 32° C.

A strip of this plate, cut to 3.5 cm. × 18 cm., is exposed to 500 Lux/cm.² for 24 seconds under a step wedge through a blue filter Kodak 2b + 49.

Thereafter the following procedure is adopted:
1. 7 minutes development in a bath which per liter contains 50 g. of anhydrous sodium sulphite, 12 g. of p-methyl-amino-phenol sulphate, 2 g. of sodium metaphosphate, 50 g. of anhydrous potassium carbonate and 10 g. of potassium bromide;
2. 2 minutes stop-fixing in a bath which per liter contains 15 g. of ammonium thiosulphate, 15 g. of potassium aluminum sulphate, 20 g. of sodium metaborate and 16 ml. of glacial acetic acid;
3. 2½ minutes soaking;
4. 8 minutes color bleaching in a bath which per liter contains 100 ml. of 37 percent strength hydrochloric acid, 150 g. of potassium bromide, 8 g. of thiourea, 5 mg. of color bleaching catalyst of formula (71)

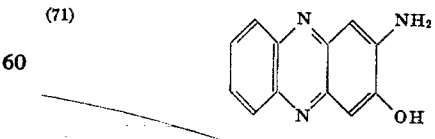

and 20 ml. of a mixture of 400 ml. of benzyl alcohol, 400 ml. of diethylene glycol and 200 ml. of water;
5. 2 minutes soaking;
6. 8 minutes bleaching of residual silver in a bath which per liter contains 150 ml. of 37 percent strength hydrochloric acid, 25 g. of crystalline copper sulphate and 30 g. of potassium bromide;
7. 2 minutes soaking;
8. 4 minutes fixing as specified under 2);
9. 10 minutes soaking;
10. 1 minute treatment in a bath which per liter contains 2 ml. of 40 percent strength sodium bisulphite solution and 0.5 g. of a 12.5 percent strength aqueous solution of a condensation product of 1 mol. of octadecyl alcohol with 35 mols of ethylene oxide.

A brilliant highly light-fast purple wedge is obtained which in the position of the originally greatest silver density is completely bleached to white.

Similar results are obtained on using one of the dyestuffs of formulae (24) to (69).

EXAMPLE 4

The following layers are successively applied to an opaque white acetate film provided with an adhesive layer:

1. Red-sensitive silver bromide emulsion in gelatine, containing the greenish-blue dyestuff of formula

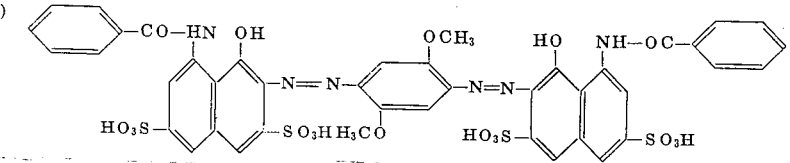
(72)

2. Colorless gelatine layer without silver halide.
3. Green-sensitive silver bromide emulsion in gelatine, containing the purple dyestuff of formula (23).
4. Blue-sensitive silver bromide emulsion in gelatine, containing the yellow dyestuff of formula

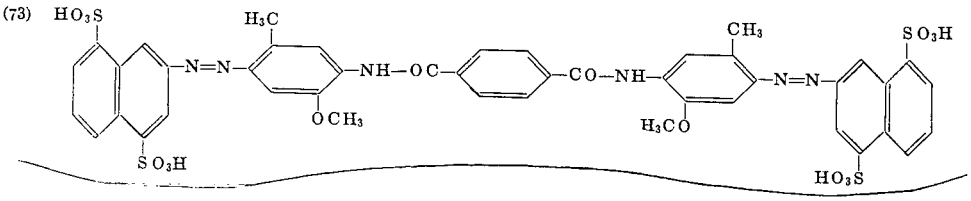
(73)

The gelatine layers can further contain additives such as wetting agents, hardeners and stabilisers for the silver halide. In other respects, the procedure followed is that the individual layers contain 0.5 g. of the particular dyestuff, and the amount of silver bromide corresponding to 1 – 1.2 g. of silver, per square meter of film.

This film is exposed to red, green and blue copying light under a coloured diapositive. Hereupon the copy is developed in accordance with the following instruction:

1. 6 minutes development in a bath which per liter of water contains 50 g. of anhydrous sodium sulphite, 0.2 g of 1-phenyl-3-pyrazolidone, 6 g. of hydroquinone, 35 g. of anhydrous sodium carbonate, 4 g. of potassium bromide and 0.3 g. of benztriazole;
2. 5 minutes soaking;
3. 6 minutes fixing in a solution of 200 g. of crystalline sodium thiosulphate and 20 g. of potassium metabisulphite in 1 liter of water;
4. 5 minutes soaking;
5. 3 to 12 minutes color bleaching with a solution which per liter of water contains 50 to 80 g. of potassium bromide, 40 to 80 g. of thiourea, 35 to 80 g. of 30 percent strength sulfuric acid and, if desired, 0.001 to 0.01 g. of color bleaching catalyst of formula (71);
6. 10 minutes soaking;
7. 5 minutes bleaching of residual silver with a solution of 60 g. of crystalline copper sulphate, 80 g. of potassium bromide and 15 ml. of 30 percent strength hydrochloric acid per liter of water;
8. 5 minutes soaking;
9. 5 minutes fixing as specified under 3.;
10. 5 minutes soaking.

A light-stable document-fast positive viewing image is obtained.

Similar results are obtained if instead of the dyestuff of formula (23) one of the dyestuffs of formulae (24) to (69) is used.

EXAMPLE 5

A test strip manufactured using the purple dyestuff of formula (25) according to Example 3, which has been exposed, is processed as follows:

1. 5 minutes development in a bath which per liter contains 1 g. of p-methylaminophenol sulphate, 20 g. of anhydrous sodium sulphite, 4 g. of hydroquinone, 10 g. of anhydrous sodium carbonate, 2 g. of potassium bromide and 3 g. of sodium thiocyanate;
2. 2 minutes soaking;
3. 2 minutes treatment in a reversal bath, which per litre contains 5 g. of potassium bichromate and 5 ml. of 96 percent strength sulphuric acid;
4. 4 minutes soaking;
5. 5 minutes treatment in a bath which per liter contains 50 g. of anhydrous sodium sulphite;
6. 3 minutes soaking;
7. 4 minutes development in a bath which per liter contains 2 g. of 1-phenyl-3-pyrazolidone, 50 g. of anhydrous sodium sulphite, 10 g. of hydroquinone, 50 g. of anhydrous sodium carbonate, 2 g. of sodium hexametaphosphate and 20 ml. of a 1 percent strength aqueous solution of tert.-butylaminoborane;
8. 2 minutes soaking;
9. further treatment as specified in Example 3 under 4. to 10.

A brilliant, highly light-fast purple wedge running counter to the initial original is obtained.

Similar results are obtained when using one of the dyestuffs of formulas (23) to (24) or (26) to (69).

I claim:

1. A silver halide photographic light-sensitive material for the silver dyestuff bleaching process, which contains on a support, at least one layer with a monoazo dyestuff of the formula G—N  N—E—(M—)$_{m-1}$(NH—Y—Q—)$_{n-1}$NH—Z—A in which G is a naphthalene radical which in the 1-position contains an azo group, in the 2-position contains a phenylamino or phenylamino group substituted by lower alkyl, lower alkoxy, halogen, sulfonic acid, alkylsulphonyl, alkylcarbonyl, phenoxy, carboxylic acid or trifluoromethyl, and in the 8-position contains a hydroxyl group, as well as at least one sulfonic acid or sulfonic acid amide group, E is a phenylene, diphenylene or naphthalene radical which contains at most 2 sulfonic acid or sulfonic acid amide groups, the radicals G and E together contain 1 to 4 sulfonic acid or sulfonic acid amide groups, M is a phthalic acid imide radical bonded to E via the imide nitrogen atom or is a radical of the formula

—NH—X—D— which is bonded to E by the nitrogen atom, X and Y each is a —CO— or —CO—NH— radical, with the nitrogen atom being bonded to D or Q, D and Q each stands for a phenylene, diphenylene or naphthalene radical, Z is an —SO$_2$—CO— or —CO—NH— radical in which the nitrogen atom is bonded to A, A is an aliphatic, aromatic or heterocyclic radical, and m and n each is 1 or 2.

2. Photographic material according to claim 1, which contains a dyestuff of the formula

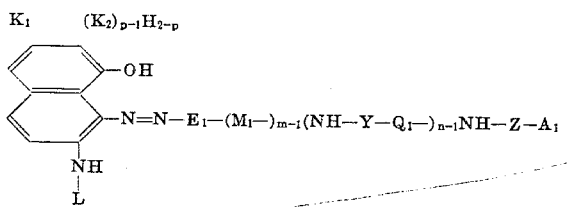

in which $K_1$ and $K_2$ each is a sulfonic acid or sulfonic acid amide group, L a benzene radical or benzene radical substituted by lower alkyl, lower alkoxy, halogen, sulfonic acid, carboxylic acid, alkylsulphonyl, alkylcarbonyl, phenoxy or trifluoromethyl, $E_1$ is an unsubstituted benzene or naphthalene radical or a benzene or naphthalene radical substituted by sulphonic acid, lower alkyl, lower alkoxy, sulfonamide, N-methyl sulfonamide, methylsulfonyl or carboxylic acid $M_1$ is an $-NH-X-D_1-$ radical, which is bonded to $E_1$ by the nitrogen atom, $D_1$ and $Q_1$ each is a benzene radical or a benzene radical substituted by nitro, methyl, methoxy, acetylamino or chlorine, $A_1$ is a lower aliphatic radical, or a chlorinated lower aliphatic radical, a benzene radical, or a benzene radical substituted by halogen, lower alkyl, lower alkoxy, benzyl, phenylsulphonyl, nitro, carboxyl, carboxylic acid amide, trifluoromethyl, acetyl, acetylamino, sulfonic acid, sulfonic acid amide, phenoxy, p-carboxy-benzoyl, p-nitro-benzyl or p-carboxy-benzyl, or a heterocyclic radical containing N, O or S; $m$, $n$ and $p$ each is 1 or 2, and X, Y and Z have the significance indicated in claim 1.

3. Photographic material according to claim 1, which contains a dyestuff of the formula

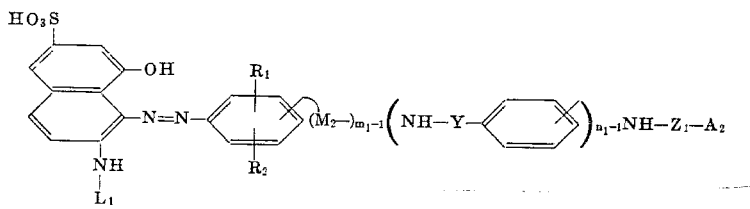

in which $L_1$ is a benzene radical which is substituted at least once by a lower alkyl or alkoxy group, a halogen atom or a sulfonic acid, alkylsulfonyl or alkylcarbonyl group, $R_1$ and $R_2$ each represents a hydrogen atom, a sulfonic acid group or a lower alkyl group, $M_2$ is a radical of the formula

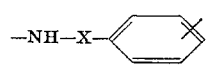

which is bonded by the nitrogen atom to the radical

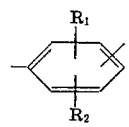

$Z_1$ is a —CO— or —CO—NH—radical wherein the nitrogen atom is bonded to $A_2$, $A_2$ is a hydrogen atom, a lower alkyl group, a thienyl group or a radical of the formula

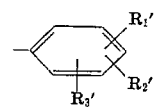

in which $R_1'$ is a hydrogen or halogen atom, a lower alkyl, a chlorinated lower alkyl, a lower alkoxy, a benzyl, a p-carboxy- or p-nitro-benzyl, a benzoyl, a p-carboxy- benzoyl, a phenylsulfonyl, a nitro, a carboxyl, a carboxylic acid amid and $R_2'$ and $R_3'$ each is a hydrogen or halogen atom, a nitro, a lower alkyl or a lower alkoxy group, and $m_1$ and $n_1$ are 1 or 2 and the sum of $m_1 + n_1$ is at most 3, and X and Y have the significance indicated in claim 1.

4. Photographic material according to claim 3, which contains a dyestuff of the formula

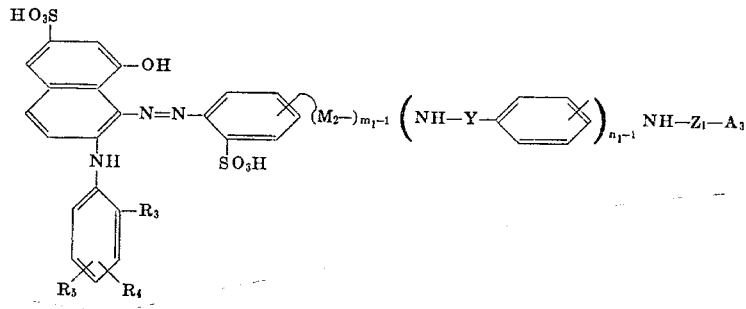

wherein $R_3$ denotes a hydrogen or chlorine atom or a methyl or methoxy group, $R_4$ denotes a fluorine or chlorine atom or a methyl, methoxy, trifluoromethyl, methylcarbonyl, methylsulfonyl or sulfonic acid group and $R_5$ denotes a hydrogen atom or a methyl group, $A_3$ denotes a hydrogen atom, an alkyl group with at most four carbon atoms or a radical of the formula

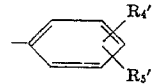

wherein $R_4'$ denotes a hydrogen or chlorine atom, a methyl, methoxy, trifluoromethyl, nitro, phenylsulfonyl, or carboxyl group, a benzoyl, a p-carboxy benzoyl, a carboxylic acid amide $R_5'$ is a hydrogen or chlorine atom, or a methoxy or nitro group, and $M_2$, $Y$, $Z_1$, $m_1$ and $n_1$ have the significance indicated in claim 3.

5. Photographic material according to claim 4, which contains a dyestuff of the formula

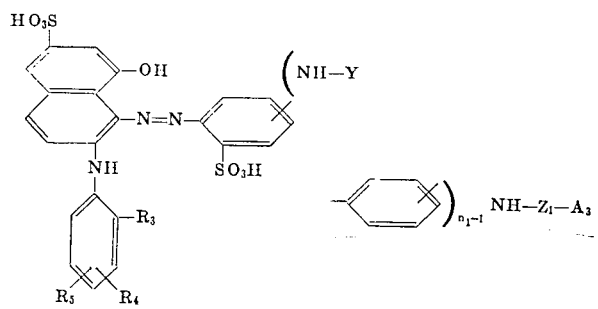

in which $R_3$, $R_4$, $R_5$, $Y$, $Z_1$, $A_3$ and $n_1$ have the significance indicated in claim 4.

6. Photographic material according to claim 4, which contains a dyestuff of the formula

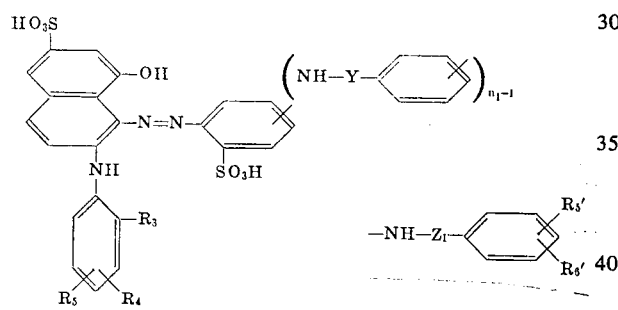

in which $R_6'$ denotes a hydrogen atom, a chlorine atom, a trifluoromethyl, methyl, methoxy, phenylsulfonyl, carboxyl, p-carboxybenzyl or p-carboxybenzoyl group, and $R_3$, $R_4$, $R_5$, $R_5'$, $Y$, $Z_1$ and $n_1$ have the significance indicated in claim 4.

7. Photographic material according to claim 1, which contains a dyestuff of the formula

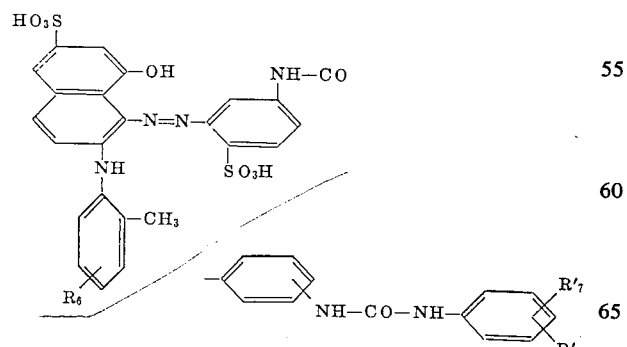

in which $R_6$ denotes a methyl group or a chlorine atom, $R_7'$ denotes a chlorine atom, a methyl or methoxy group, and $R_8'$ denotes a methoxy group or a chlorine or hydrogen atom.

8. Photographic material according to claim 1, which contains a dyestuff of the formula

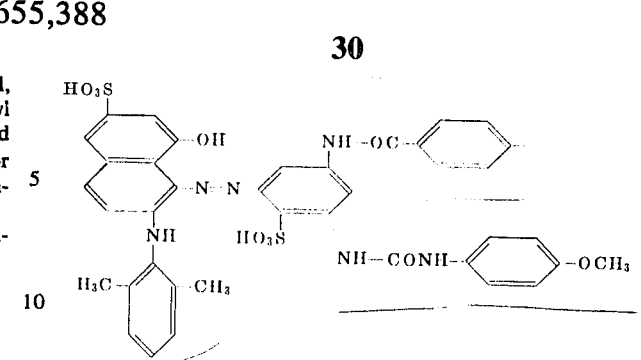

9. Photographic material according to claim 1, which contains a dyestuff of the formula

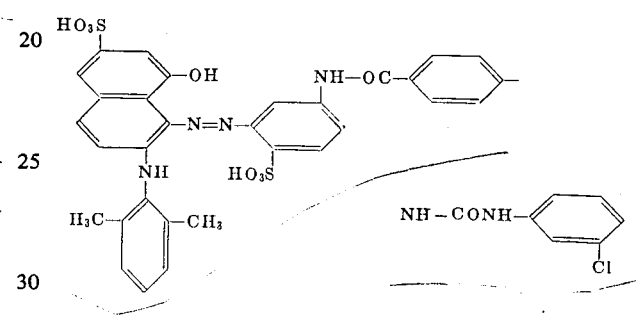

10. Photographic material according to claim 1, which contains a dyestuff of the formula

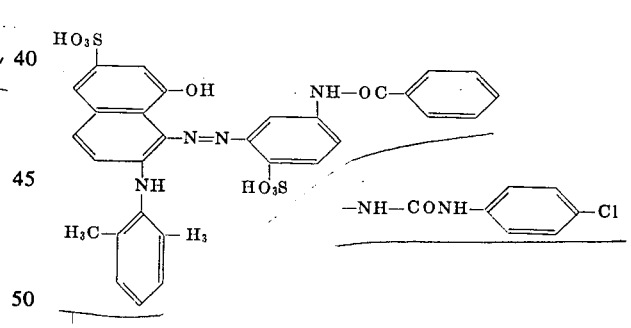

11. Photographic material according to claim 1, which contains a dyestuff of the formula

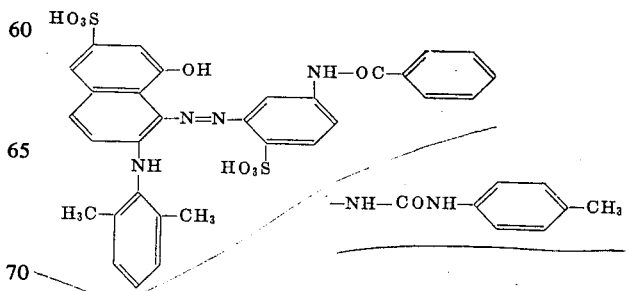

* * * * *

UNITED STATES PATENT OFFICE
CERTIFICATE OF CORRECTION

Patent No. 3,655,388         Dated April 11, 1972

Inventor(s) BERNHARD PILLER

It is certified that error appears in the above-identified patent and that said Letters Patent are hereby corrected as shown below:

Column 1, "[73] Assignee: Ciba Limited, Basel, Switzerland" should read --- [73] Assignee: CIBA-GEIGY AG, Basel Switzerland ---.

Column 26, claim 1, line 55 should be amended to read:

--- $G-N=N-E-(M-)_{m-1}(NH-Y-Q-)_{n-1}NH-Z-A$ ---

Column 27, claim 2, lines 5-13, the left-hand portion of the structural formula should be amended to read:

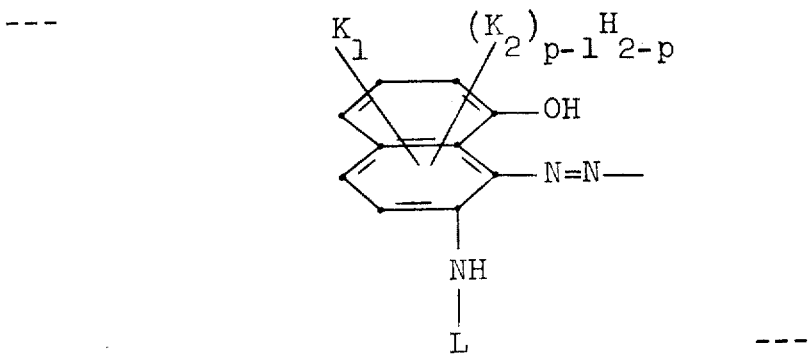

UNITED STATES PATENT OFFICE
CERTIFICATE OF CORRECTION

Patent No. 3,655,388          Dated April 11, 1972

Inventor(s) BERNHARD PILLER

It is certified that error appears in the above-identified patent and that said Letters Patent are hereby corrected as shown below:

Column 30, claim 10, lines 39 to 50, the left-hand portion of the structural formula should be amended to read:

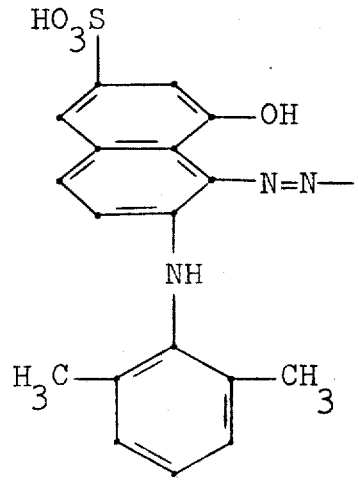

Signed and sealed this 8th day of May 1973.

(SEAL)
Attest:

EDWARD M. FLETCHER, JR.
Attesting Officer

ROBERT GOTTSCHALK
Commissioner of Patents